United States Patent
Li et al.

(10) Patent No.: US 10,139,971 B2
(45) Date of Patent: Nov. 27, 2018

(54) TOUCH DISPLAY PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yanchen Li, Beijing (CN); Peizhi Cai, Beijing (CN); Xi Chen, Beijing (CN); Xu Cao, Beijing (CN); Fengchun Pang, Beijing (CN); Jinyu Li, Beijing (CN); Xingyou Luo, Beijing (CN); Lei Ma, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 186 days.

(21) Appl. No.: 15/225,557

(22) Filed: Aug. 1, 2016

(65) Prior Publication Data
US 2017/0277297 A1 Sep. 28, 2017

(30) Foreign Application Priority Data
Mar. 24, 2016 (CN) .......................... 2016 1 0173596

(51) Int. Cl.
 *G06F 3/044* (2006.01)
(52) U.S. Cl.
 CPC .................... *G06F 3/044* (2013.01)

(58) Field of Classification Search
 CPC ..................................................... G06F 3/044
 See application file for complete search history.

(56) References Cited

U.S. PATENT DOCUMENTS

| | | | | |
|---|---|---|---|---|
| 9,727,167 B2* | 8/2017 | Yang | ...................... | G06F 3/0416 |
| 2012/0313881 A1* | 12/2012 | Ge | ...................... | G02F 1/13338 345/174 |
| 2016/0048248 A1* | 2/2016 | Na | ......................... | G06F 3/044 345/174 |

* cited by examiner

*Primary Examiner* — Nelson Rosario
*Assistant Examiner* — Scott Au
(74) *Attorney, Agent, or Firm* — Kinney & Lange, P.A.

(57) ABSTRACT

A touch display panel and a display device are disclosed which achieve touch function and narrow bezel function while the required number of the vertical wiring is reduced and the aperture ratio of the touch display panel is increased. The touch display panel includes a substrate, a plurality of gate lines arranged laterally and a plurality of touch electrodes arranged in an array on the substrate, wherein, it further includes a plurality of signal leads which are arranged longitudinally and arranged to cross the gate lines and be insulated therefrom, each of the signal leads having a first and a second sub-signal leads; each of the first sub-signal leads is electrically connected to a gate line at an intersection to connect the gate line longitudinally to a gate driving circuit for controlling the operation of the touch display panel; each of the second sub-signal leads is electrically connected to a touch electrode to be used as a touch lead for the touch electrode; the first and second sub-signal leads are arranged to be disconnected from each other.

9 Claims, 8 Drawing Sheets

TOUCH DISPLAY PANEL AND DISPLAY DEVICE

CROSS-REFERENCE TO RELATED APPLICATION

This application claims the benefit of Chinese Patent Application No. 201610173596.4 filed on Mar. 24, 2016 in the State Intellectual Property Office of China, the whole disclosure of which is incorporated herein by reference.

BACKGROUND OF THE INVENTION

Field of the Invention

Embodiments of the present disclosure relate to the field of display technology, especially to a touch display panel and a display device.

Description of the Related Art

In order to pursue thinness and lightweight of a touch panel, research of integration of a touch panel and an LCD display substrate has become increasingly popular. Among others, an In-Cell solution in which the function of the touch panel is embedded into the LCD substrate has attracted widespread attention. The In-Cell touch solutions include a self-capacitance type and a mutual capacitance type. Below, the self-capacitance type is briefly introduced.

The self-capacitance type involves dividing a common electrode layer on an array substrate into a plurality of blocks as touch electrodes, using a specific metal wiring as touch leads, one end of the touch lead is connected to the touch electrode via a through hole, the other end thereof is connected to a touch circuit. When a finger touches the touch display panel, it will cause a fluctuation in capacitance value of the touch electrode at the corresponding location. The touch circuit can determine the touch location by detecting the fluctuation in capacitance value, so as to achieve the touch function.

At the same time, in order to achieve a high proportion of screen in consumer electronics products, design of a narrow bezel has become increasingly popular. In order to obtain a narrow bezel on both left and right sides, a design in which a gate driving circuit or a gate driver on array (GOA) is provided on an upper side of the display substrate has more and more applications.

In order to obtain a self-capacitance touch function, it is necessary to further provide a sufficient number of vertical wirings to be used as touch leads. The touch leads are guided from the lower side of the touch substrate to the touch circuit. In order to obtain a narrow bezel on both left and right sides, for the design in which the gate driving circuit is provided on the upper side of the display substrate, it is also necessary to further provide a sufficient number of vertical wirings to connect lateral gate lines in a vertical direction to the gate driving circuit on the upper side of the display substrate. As for the touch display panel which simultaneously employs a design with a self-capacitance touch function and a narrow bezel function, it is necessary to further provide many vertical wirings.

In summary, in the prior art, when it is needed to achieve a touch function and a narrow bezel function, more vertical wirings are required, which results in a low aperture ratio of the touch display panel.

SUMMARY OF THE INVENTION

Embodiments of the present disclosure provide a touch display panel and a display device which achieve a touch function and a narrow bezel function while the number of the vertical wirings is reduced and the aperture ratio of the touch display panel is increased.

An embodiment of the present disclosure provides a touch display panel which includes a substrate, a plurality of gate lines arranged laterally and a plurality of touch electrodes arranged in an array on the substrate, wherein, it further includes a plurality of signal leads which are arranged longitudinally, each of the signal leads comprising a first and a second sub-signal leads;

each of the first sub-signal leads is electrically connected to a gate line at an intersection to connect the gate line longitudinally to a gate driving circuit for controlling the operation of the touch display panel, and the first sub-signal leads cross the gate lines and are insulated from the gate lines except for the intersection;

each of the second sub-signal leads is electrically connected to a touch electrode to be used as a touch lead for the touch electrode, and the second sub-signal leads cross the gate lines and are insulated from the gate lines;

the first and second sub-signal leads are arranged to be disconnected from each other.

The embodiment of the present disclosure provides a touch display panel which includes a plurality of signal leads which are arranged longitudinally, each of the signal leads having a first and a second sub-signal leads; a first sub-signal leads is electrically connected to a gate line at an intersection to connect the gate line to a gate driving circuit; a second sub-signal leads is electrically connected to a touch electrode to be used as a touch lead for the touch electrode. That is, in the embodiment of the present disclosure, a signal lead can connect a gate line to achieve a narrow bezel function and also can be used as a touch lead to achieve a touch function. Compared with the prior art in which two different vertical wirings are needed so as to achieve the narrow bezel function and a touch function respectively, the embodiment of the present disclosure may achieve touch function and narrow bezel function while the required number of the vertical wiring is reduced and the aperture ratio of the touch display panel is increased.

According to an embodiment, the touch display panel further comprises a plurality of gate leads arranged parallel to the signal leads, each of the gate leads is electrically connected at an intersection to a gate line which is not electrically connected to the first sub-signal lead, so as to connect the gate line longitudinally to the gate driving circuit, the gate leads are arranged to cross the gate lines and are insulated from the gate lines except for the intersection.

According to an embodiment, the touch display panel further comprises a plurality of touch leads arranged to cross the gate line and be insulated therefrom, the touch leads are arranged parallel to the signal leads, each of the touch leads is electrically connected to a touch electrode which is not electrically connected to the second sub-signal lead, so as to be used as a touch lead for the touch electrode.

According to an embodiment, an extending length in the longitudinal direction of the gate lead equals to that of the touch lead.

According to an embodiment, the signal leads, the gate leads and the touch leads are all arranged in a same layer as data lines which are arranged longitudinally on the substrate and are insulated from the data lines.

According to an embodiment, each signal lead, each gate lead and each touch lead are positioned in one-to-one correspondence with the pixel units which are arranged in different columns on the substrate;

the signal lead, the gate lead or the touch lead is arranged between two adjacent pixel units.

According to an embodiment, each signal lead, each gate lead and each touch lead are positioned in one-to-one correspondence with the pixel units which are arranged in different columns on the substrate;

each of the pixel units comprises a red sub-pixel unit with a red color resistance, a green sub-pixel unit with a green color resistance, and a blue sub-pixel unit with a blue color resistance;

the signal lead is arranged between the red sub-pixel unit and the green sub-pixel unit, or between the green sub-pixel unit and the blue sub-pixel unit;

the gate lead is arranged between the red sub-pixel unit and the green sub-pixel unit, or between the green sub-pixel unit and the blue sub-pixel unit;

the touch lead is arranged between the red sub-pixel unit and the green sub-pixel unit, or between the green sub-pixel unit and the blue sub-pixel unit.

According to an embodiment, the first sub-signal lead is electrically connected at an intersection to the gate line via a through hole in a first insulating layer; the first insulating layer is arranged between the first signal lead and the gate line.

According to an embodiment, the touch electrodes double as a common electrode on the substrate, the second sub-signal lead is electrically connected to the touch electrode via a through hole extending through a second insulating laye arranged between the common electrode and the second sub-signal lead.

An embodiment of the present disclosure also provides a display device which comprises a touch display panel as described above.

LIST OF REFERENCE SIGNS

10, touch electrode; 11, touch electrode unit; 51, signal lead; 511, the first sub-signal lead; 512, the second sub-signal lead; 52, gate line; 53, touch leads; 60, pixel unit; 601, red sub-pixel unit; 602, green sub-pixel unit; 603, blue sub-pixel unit; 80, substrate; 81, the first insulating layer; 82, gate line; 83, the second insulating layer; 84, common electrode

DETAILED DESCRIPTION OF PREFERRED EMBODIMENTS OF THE INVENTION

Figure 1:
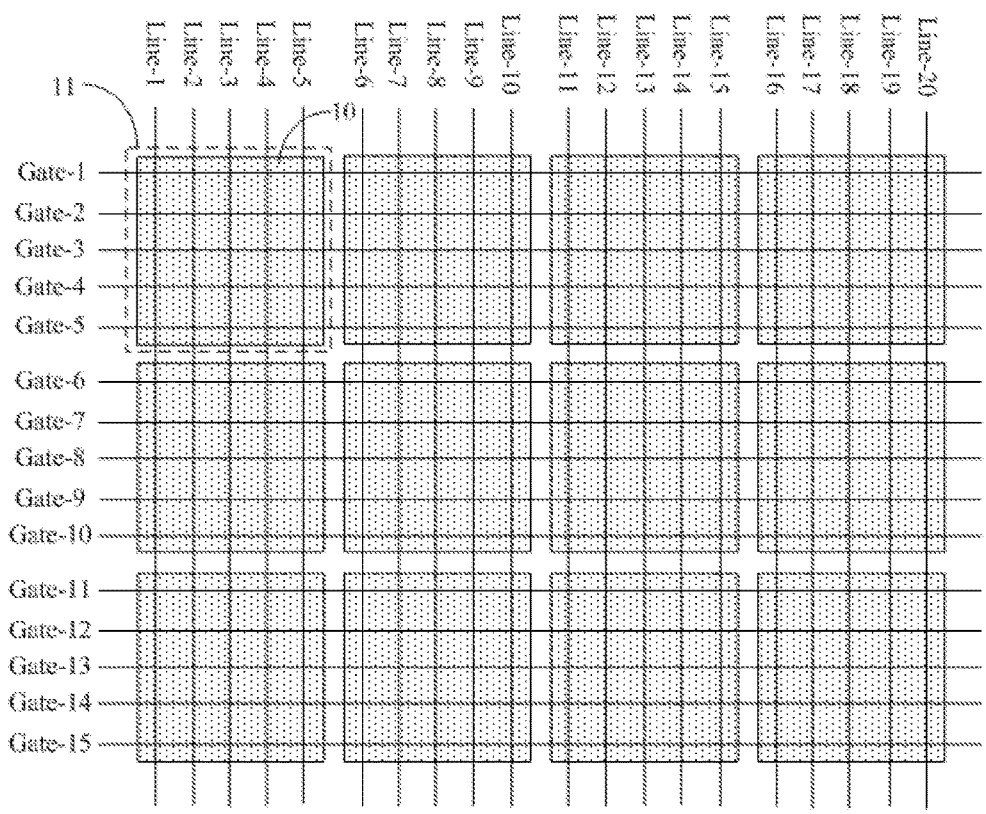
FIG. 1 is a diagram of touch electrodes and vertical wirings distribution in a touch display panel.
Figure 2:
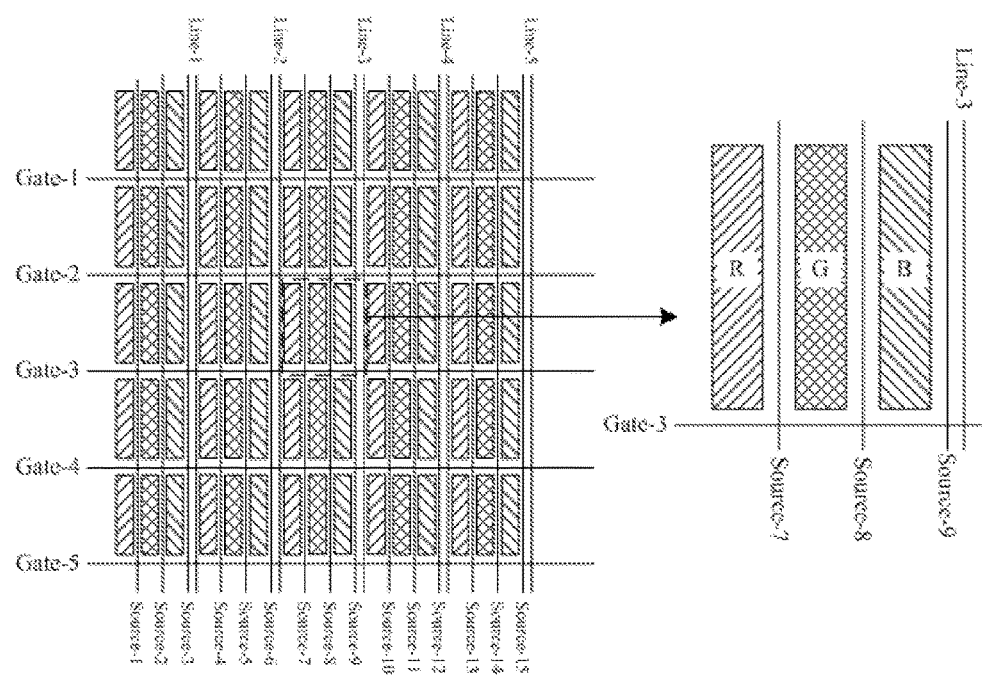
FIG. 2 is a diagram of a design of a specific pixel unit in each of touch electrode units.

A touch display panel which can achieve both a self-capacitance touch function and a narrow bezel function is shown in FIG. 1. In FIG. 1, an example is described in which a common electrode layer 84 on an array substrate is divided into 12 blocks consisting of three rows and four columns, each of the blocks is used as a touch electrode 10. In an example shown in FIG. 1, each touch electrode unit 11 comprises 25 pixel units consisting of five rows and five columns, each row of pixel units are connected to a gate line, for an instance, a first row of pixel units are connected to a gate line Gate-1, a second row of pixel units are connected to a gate line Gate-2, a third row of pixel units are connected to a gate line Gate-3, etc. In order to assure the uniformity of the vertical wirings provided in the touch display panel as well as the aperture ratio of the touch display panel, a vertical wiring is provided in correspondence with each column of pixel units, that is, the touch display panel is provided with 20 vertical wirings such as Line-1, Line-2, Line-3, etc. FIG. 2 shows the configuration of the pixel units in each of touch electrode units.

As shown in FIG. 2, each touch electrode unit 11 comprises 5 gate lines, 15 source lines and 5 vertical wirings (Line). A dashed box in central of FIG. 2 is in correspondence with a pixel unit, the enlarged view of which is shown on the right side of FIG. 2. Each of the pixel units comprises a red sub-pixel unit (R), a green sub-pixel unit (G), and a blue sub-pixel unit (B). Each sub-pixel unit is in correspondence with a source line.

Figure 3:
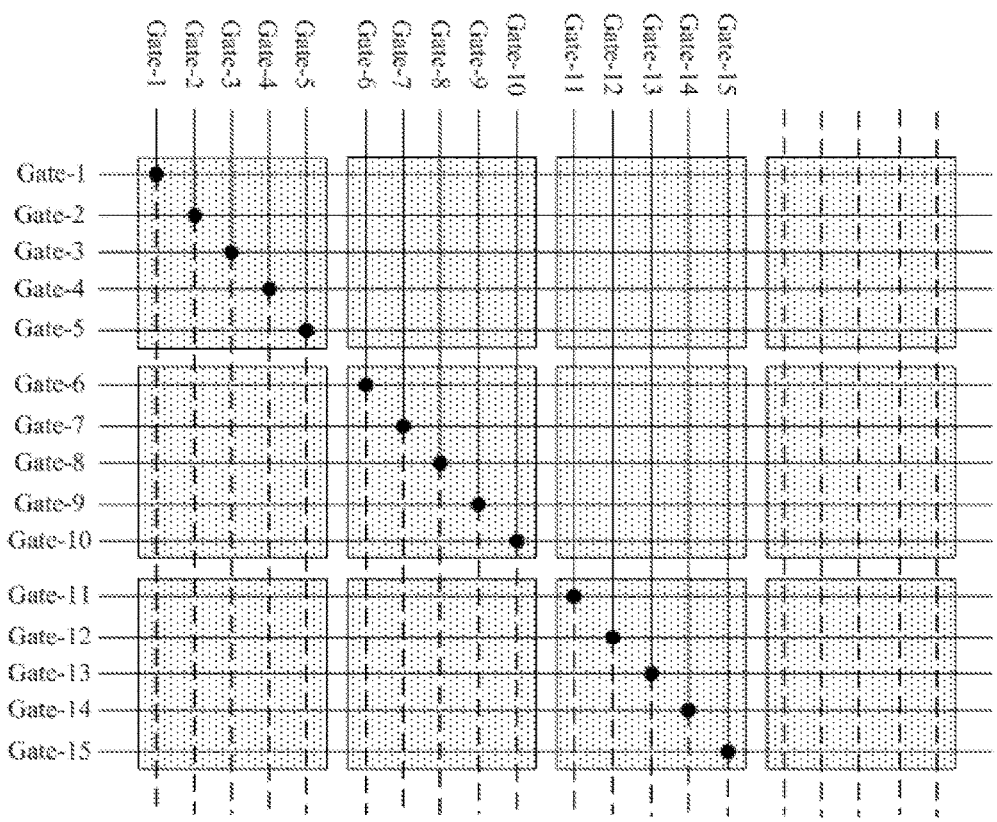
FIG. 3 is a diagram of a touch display panel in which the lateral gate lines are connected vertically.

The vertical wirings (Line) of the touch display panel may be connected to the Gate lines via a through hole so as to connect the lateral Gate lines in vertical direction to obtain a narrow design on the left and right sides of the touch display panel, as shown in FIG. 3. The vertical wirings can also be connected to the touch electrode via a through hole so as to achieve a touch function, as shown in FIG. 4.

Specifically, as shown in FIG. 3, the lateral gate lines Gate-1 to Gate-15 are connected to the vertical wirings via a through hole passing through an insulating layer respectively, such that the gate lines are guided out from the upper side of the touch display panel through the vertical wirings. In FIG. 3, in order to ensure the stability of the signal in Line wirings, the parts of solid line and dotted line of each of the Line wirings which guide out the Gate line are connected. Of course, the parts of solid line and dotted line may be disconnected and the part of dotted line may be connected to a common electrode line. Further, although the rightmost five dotted lines in FIG. 3 are not used when the gate lines are guided out, these five Line wirings are still provided to assure the uniformity of the vertical Line wirings provided in the touch display panel as a whole.

Figure 4:
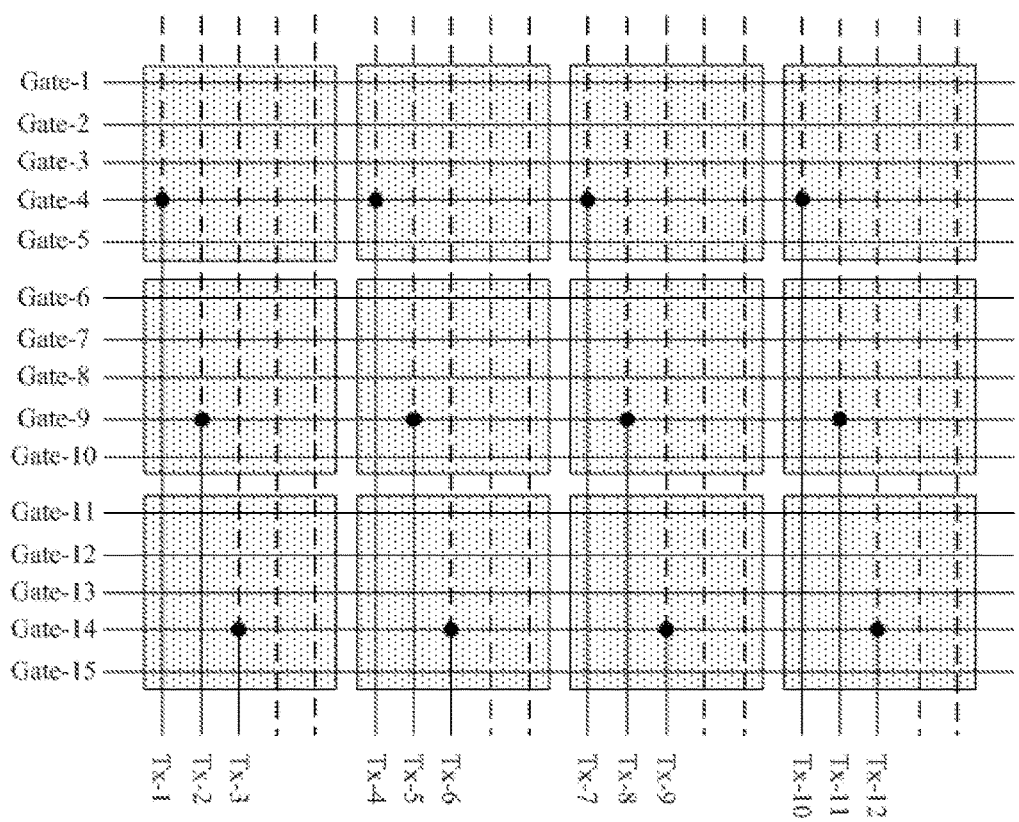
FIG. 4 is a diagram of a touch display panel when the touch electrodes are connected to the touch leads.

Specifically, as shown in FIG. 4, Line-1, Line-2, Line-3, Line-6, Line-7, Line-8, Line-11, Line-12, Line-13, Line-16, Line-17 and Line-18 are used as touch leads (Tx), and 12 touch electrodes 10 are connected with the selected 12 touch leads (Tx) respectively via through holes passing through an insulating layer. In FIG. 4, in order to ensure the stability of the signal in Line wirings, the parts of solid line and dotted line of the Line wirings as the Tx leads are connected. Of course, the parts of solid line and dotted line may be disconnected and the part of dotted line may be connected to a common electrode line. Further, although some of Line wirings are not used as Tx leads, these Line wirings are still provided to assure the uniformity of the vertical Line wirings in the touch display panel as a whole.

As it can be seen from FIGS. 1-4, 20 Line wirings are provided in the touch display panel. In order to achieve a narrow bezel function, it needs 15 Line wirings to guide out the gate lines. In order to achieve a touch function, it needs 12 Line wirings to be used as Tx wirings. When it needs to achieve a touch function and a narrow bezel function at the same time, a touch display panel needs 27 Line wirings which exceeds 20 line wirings provided in the touch display panel. In the prior art, it is necessary to provide additional Line wirings. When the additional wirings are provided, they will reduce the aperture ratio of the touch display panel.

Embodiments of the present disclosure provide a touch display panel and a display device which achieve a touch function and a narrow bezel function while the required number of the vertical wiring is reduced and the aperture ratio of the touch display panel is increased.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

Below a touch display panel provided by an embodiment of the present disclosure will be described in detail with reference to the Figures.

In the Figures, the thickness of respective film layer as well as the size and the shape of the region do not reflect the true scale of respective film layer, and the purpose is to schematically illustrate the content of the present invention.

Figure 5:
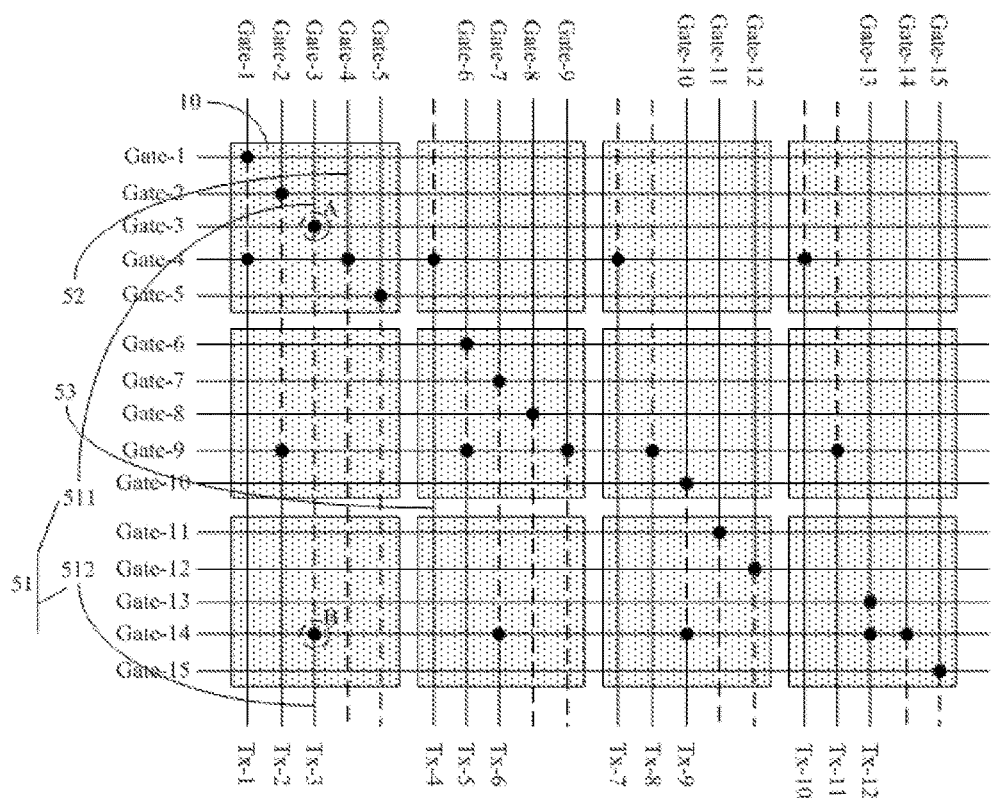
FIG. 5 is a diagram of a touch display panel provided by an embodiment of the present disclosure.

As shown in FIG. 5, a specific embodiment of the present disclosure provides a touch display panel which includes a substrate (not shown in the figure), a plurality of gate lines Gate-1, Gate-2, . . . arranged laterally on the substrate and a plurality of touch electrodes 10 arranged in an array. The touch display panel further includes a plurality of signal leads 51 which are arranged longitudinally and arranged to cross the gate lines and be insulated therefrom, each of the signal leads 51 having a first and a second sub-signal leads 511, 512; each of the first sub-signal leads 511 is electrically connected to a gate line at an intersection to guide out the gate line longitudinally to a gate driving circuit for controlling the operation of the touch display panel; each of the second sub-signal leads 512 is electrically connected to a touch electrode 10 to be used as a touch lead for the touch electrode 10; and the first and second sub-signal leads 511 and 512 are arranged to be disconnected from each other.

The touch display panel in the embodiment of the present disclosure is described as an example that it comprises 12 touch electrodes 10 consisting of 3 rows and 4 columns, each of the 12 touch electrodes comprises 25 pixel units consisting of 5 rows and 5 columns, and the gate driving circuit in the embodiment of the present disclosure is provided on the upper side of the touch display panel for example.

Figure 6:
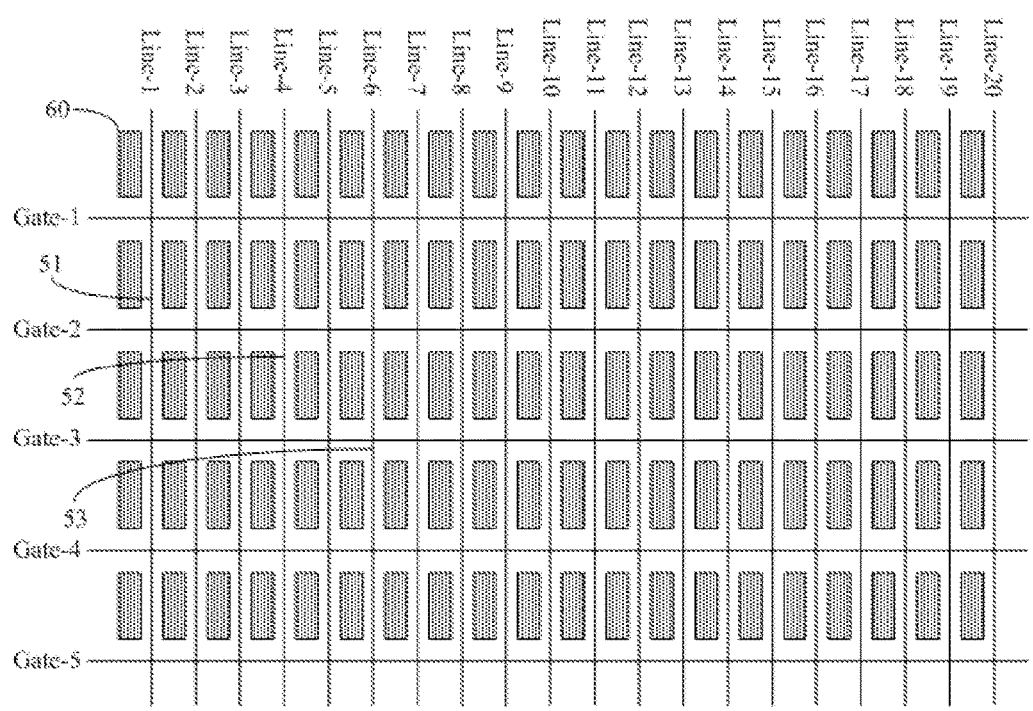
FIG. 6 is a diagram of the position relationship between the signal leads, the gate leads and the touch leads comprised by a touch display panel and the pixel units comprised by the touch display panel according to an embodiment of the present disclosure.

Similar to FIG. 1, in the embodiment of the present disclosure, the wirings arranged longitudinally are labeled from left to right as Line-1, Line-2, Line-3, Line-4, Line-5, Line-6, Line-7, Line-8, Line-9, Line-10, Line-11, Line-12, Line-13, Line-14, Line-15, Line-16, Line-17, Line-18, Line-19 and Line-20, as shown in FIG. 6.

As shown in FIG. 5, the touch display panel in the embodiment of the present disclosure comprises signal leads Line-1, Line-2, Line-3, Line-7, Line-8, Line-13 and Line-18. In the embodiment of the present disclosure, each of the signal leads has a first and a second sub-signal leads; a first sub-signal leads is electrically connected to a gate line at an intersection to guide out the gate line to a gate driving circuit; a second sub-signal leads is electrically connected to a touch electrode to be used as a touch lead. Therefore, in the embodiment of the present disclosure, a single signal lead can guide out a gate line to achieve a narrow bezel function and also can be used as a touch lead to achieve a touch function. Compared with the illustration of FIGS. 3 and 4 that two different vertical wirings are needed so as to achieve the narrow bezel function and a touch function, the embodiment of the present disclosure may achieve touch function and narrow bezel function while the required number of the vertical wirings is reduced and the aperture ratio of the touch display panel is increased.

When being implemented in an embodiment of the present disclosure, a signal lead may be used to guide out the gate line to the gate driving circuit and be also used as a touch lead. Therefore, it is necessary to disconnect the first and second sub-signal leads to prevent crosstalk between the gate driving signal and the touch signal.

Further, when being implemented, in order to assure the uniformity of the signal leads in the design of the touch display panel, each of the first signal lead also comprises a third sub-signal lead which is shown as the part of a dotted line between the first and second signal leads. The third sub-signal lead is not connected to the first sub-signal lead and the interval between the first and the third sub-signal leads is a predetermined interval. When being designed, the value of the predetermined interval is set relatively small, as long as the first and the third sub-signal leads are assured not to be electrically connected. Similarly, the value of the interval between the third and the second sub-signal leads is set relatively small, as long as the second and the third sub-signal leads are assured not to be electrically connected. In actual use, in order to ensure the stability of the signal in the third sub-signal lead, the third sub-signal lead may be electrically connected to the common electrode line provided on the touch display panel.

Specially, as shown in FIG. 5, the touch display panel in an embodiment of the present disclosure further comprises a plurality of gate leads 52, the gate leads 52 are arranged parallel to the signal leads 51, each of the gate leads 52 is electrically connected at an intersection to a gate line which is not electrically connected to the first sub-signal lead 511, so as to guide the gate line longitudinally out to the gate driving circuit for controlling the operation of the touch display panel, the gate leads are arranged to cross the gate lines and are insulated from the gate lines except for the intersection.

Gate leads comprised by the touch display panel in the embodiment of the present disclosure are respectively: Line-4, Line-5, Line-9, Line-10, Line-14, Line-15, Line-19 and Line-20. The arrangement of the gate leads in the embodiment of the present disclosure is similar to that of FIG. 3, description thereof is omitted.

Specifically, as shown in FIG. 5, the touch display panel in the embodiment of the present disclosure further comprises a plurality of touch leads 53 arranged to cross the gate lines and be insulated therefrom, the touch leads 53 are arranged parallel to the signal leads 51, each of the touch leads 53 is electrically connected to a touch electrode 10 which is not electrically connected to the second sub-signal lead 512, so as to be used as a touch lead for the touch electrode 10.

Touch leads comprised by the touch display panel in an embodiment of the present disclosure are respectively: Line-6, Line-11, Line-12, Line-16 and Line-17. The arrangement of the touch leads in the embodiment of the present disclosure is similar to that of FIG. 4, description thereof is omitted.

As shown in FIG. 5, by reasonably setting the number of the signal leads, the gate leads and the touch leads, the embodiment of the present disclosure reduces 27 Line wirings, which is needed for a touch display panel to achieve a touch function and a narrow bezel function at the same time in FIGS. 3 and 4, to 20 line wirings, reducing the required number of the vertical wirings and increasing the aperture ratio of the touch display panel.

In an embodiment of the present disclosure, in order to assure the uniformity of the arrangement of the gate leads and the touch leads, an extending length in the longitudinal direction of the gate lead equals to that of the touch lead.

In an embodiment of the present disclosure, the signal leads, the gate leads and the touch leads are all arranged in a same layer as data lines which are arranged longitudinally on the substrate and are insulated from the data lines. As the signal leads, the gate leads and the touch leads are all arranged in a same layer as data lines, the signal leads, the gate leads and the touch leads can be manufactured in one same patterning process with the data lines, which can save production processes and reduce production costs.

Specifically, as shown in FIG. 6, in an embodiment of the present disclosure, each signal lead 51, each gate lead 52 and each touch lead 53 are positioned in one-to-one correspondence with the pixel units which are arranged in different columns on the substrate; the signal lead 51, the gate lead 52 or the touch lead 53 is arranged between two adjacent pixel units 60. In FIG. 6, the corresponding relationship between each Line wiring with the signal lead 51, gate lead 52 and touch lead 53 is discussed as above.

Figure 7:
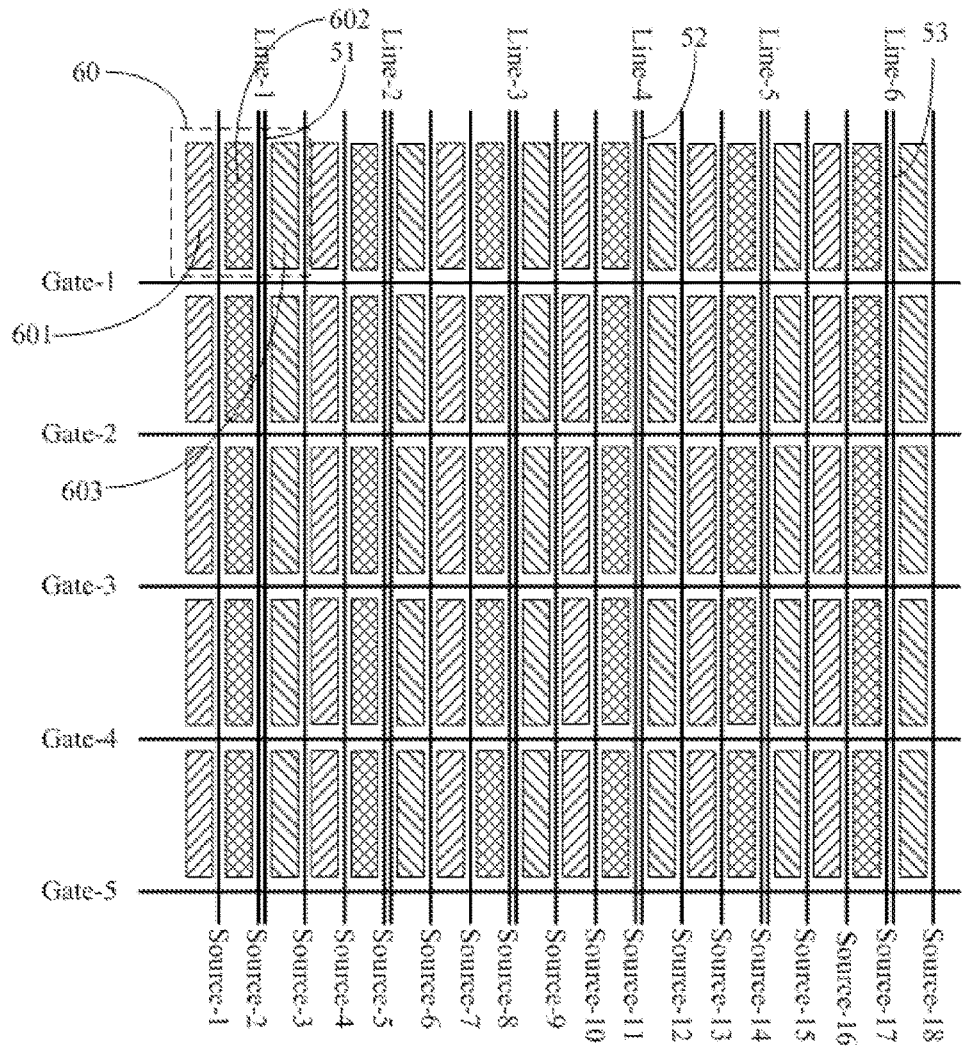
FIG. 7 is another diagram of the position relationship between the signal leads, the gate leads and the touch leads comprised by a touch display panel and the pixel units comprised by the touch display panel according to an embodiment of the present disclosure.

Specifically, as shown in FIG. 7, in an embodiment of the present disclosure, each signal lead 51, each gate lead 52 and each touch lead 53 are positioned in one-to-one correspondence with the pixel units 60 which are arranged in different columns on the substrate; each of the pixel units 60 comprises a red sub-pixel unit 601 with a red color resistance, a green sub-pixel unit 602 with a green color resistance, and a blue sub-pixel unit 603 with a blue color resistance.

As shown in FIG. 7, the signal lead 51 is arranged between the red sub-pixel unit 602 and the blue sub-pixel unit 603; the gate lead 52 is arranged between the green sub-pixel unit 602 and the blue sub-pixel unit 603; the touch lead 53 is arranged between the green sub-pixel unit 602 and the blue sub-pixel unit 603. FIG. 7 only shows some of Line wirings and in FIG. 7, the corresponding relationship between each Line wiring with the signal lead 51, gate lead 52 and touch lead 53 is discussed as above.

Further, in an embodiment of the present disclosure, the signal leads are arranged between the red sub-pixel unit and the green sub-pixel unit, the gate leads are arranged between the red sub-pixel unit and the green sub-pixel unit, the touch leads are arranged between the red sub-pixel unit and the green sub-pixel unit. The specific arrangement is similar to that in FIG. 7. Thus, in embodiments of the present disclosure, the specific arrangement of signal leads, gate leads and touch leads is more flexible.

Figure 8:
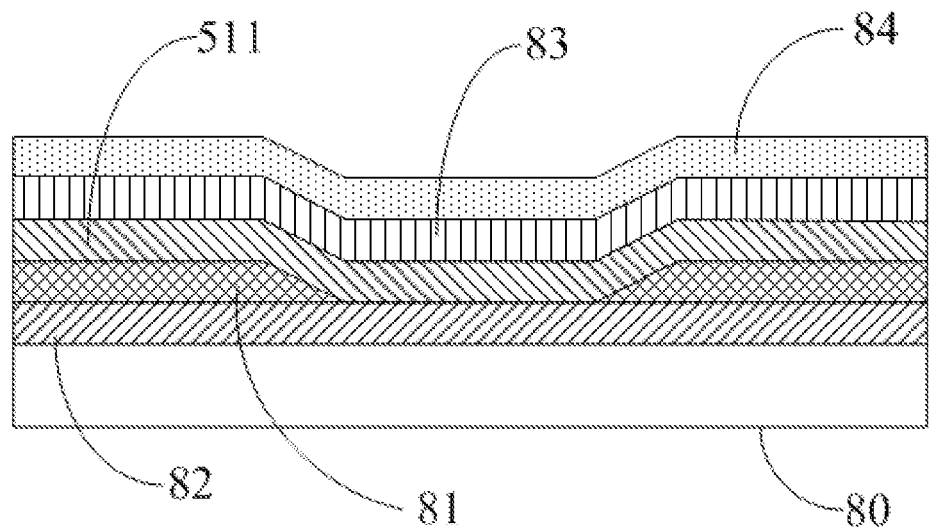
FIG. 8 is a structural diagram when the first sub-signal lead is electrically connected to the gate line provided by an embodiment of the present disclosure.

Optionally, the specific connection relationship between the first sub-signal lead and the gate line at the position A in FIG. 5 is shown in FIG. 8. The first sub-signal lead 511 is electrically connected to the gate line 82 via a through hole in a first insulating layer 81. The first insulating layer 81 is arranged between the first signal lead 511 and the gate line 82. A second insulating layer 83 is provided above the first sub-signal lead 511 and a common electrode 84 is provided on the second insulating layer 83.

Figure 9:
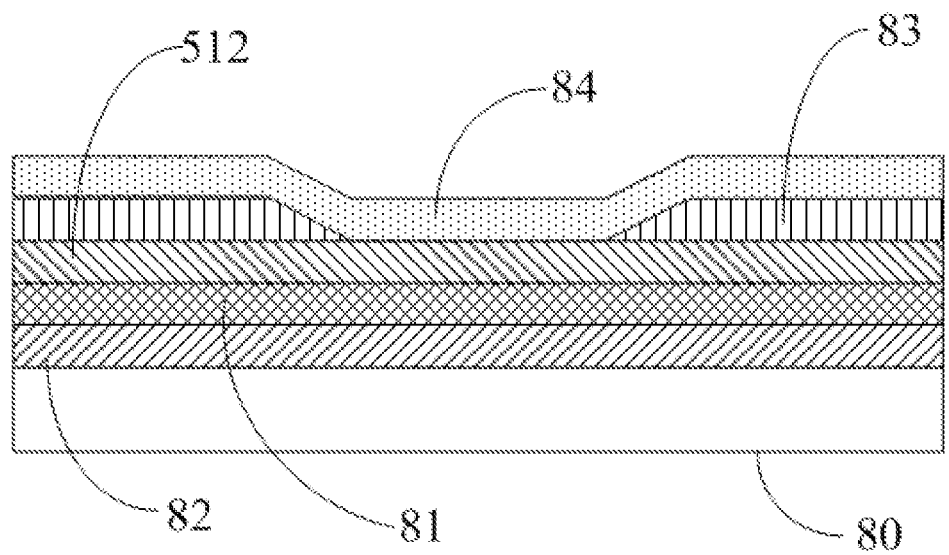
FIG. 9 is a structural diagram when the second sub-signal lead is electrically connected to the touch electrode provided by an embodiment of the present disclosure

Optionally, the specific connection relationship between the second sub-signal lead and the gate line at the position B in FIG. 5 is shown in FIG. 9. The touch electrodes in the embodiment of the present disclosure double as the common electrodes 84 provided on the substrate 80. The method with which the common electrodes in the embodiment of the present disclosure double as touch electrodes is same as that of the prior art, description thereof is omitted. In the embodiment of the present disclosure, the second sub-signal lead 512 is electrically connected to the touch electrode via a through hole in the second insulating layer 83; the second insulating layer 83 is arranged between the common electrode 84 and the second sub-signal lead 512.

An embodiment of the present disclosure also provides a display device which comprises a touch display panel as mentioned above. The display device may be a LCD panel, a LCD display, a LCD TV, an Organic Light Emitting Diode (OLED) panel, an OLED display, an OLED TV or an electronic paper and the like.

In summary, embodiments of the present disclosure provides a touch display panel which includes a substrate, a plurality of gate lines arranged laterally and a plurality of touch electrodes arranged in an array on the substrate, wherein, it further includes a plurality of signal leads which are arranged longitudinally, each of the signal leads having a first and a second sub-signal leads; each of the first sub-signal leads is electrically connected to a gate line at an intersection to guide out the gate line longitudinally to a gate driving circuit for controlling the operation of the touch display panel, and the first sub-signal leads cross the gate lines and are insulated from the gate lines except for the intersection; each of the second sub-signal leads is electrically connected to a touch electrode to be used as a touch lead for the touch electrode, and the second sub-signal leads cross the gate lines and are insulated from the gate lines except for the intersection; the first and second sub-signal leads are arranged to be disconnected from each other. In the embodiments of the present disclosure, each of the signal leads having a first and a second sub-signal leads; a first sub-signal leads is electrically connected to a gate line at an intersection to guide out the gate line to a gate driving circuit; a second sub-signal leads is electrically connected to a touch electrode to be used as a touch lead for the touch electrode. That is, a signal lead can guide out a gate line to achieve a narrow bezel function and also can be used as a touch lead to achieve a touch function. Compared with the prior art that two different vertical wirings are separately needed so as to achieve the narrow bezel function and a touch function, the embodiments of the present disclosure may achieve touch function and narrow bezel function while the required number of the vertical wirings is reduced and the aperture ratio of the touch display panel is increased.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A touch display panel, comprising a substrate, and a plurality of gate lines arranged laterally and a plurality of touch electrodes arranged in an array on the substrate, wherein, the touch display panel further comprises a plurality of signal leads which are arranged longitudinally, each of the signal leads comprising a first and a second sub-signal leads;

each of the first sub-signal leads is electrically connected to a gate line at an intersection to connect the gate line longitudinally to a gate driving circuit for controlling the operation of the touch display panel, and the first sub-signal leads cross the gate lines and are insulated from the gate lines except for the intersection;

each of the second sub-signal leads is electrically connected to a touch electrode so as to be used as a touch lead for the touch electrode, and the second sub-signal leads cross the gate lines and are insulated from the gate lines except for the intersection;

the first and second sub-signal leads are arranged to be disconnected from each other; and a plurality of gate leads arranged parallel to the signal leads, each of the gate leads is electrically connected at an intersection to a gate line which is not electrically connected to the first sub-signal lead, so as to connect the gate line longitudinally to the gate driving circuit, the gate leads are arranged to cross the gate lines and are insulated from the gate lines except for the intersection.

2. The touch display panel according to claim 1, further comprising a plurality of touch leads arranged to cross the gate lines and are insulated from the gate lines, the touch leads are arranged parallel to the signal leads, each of the touch leads is electrically connected to a touch electrode which is not electrically connected to the second sub-signal lead, so as to be used as a touch lead for the touch electrode.

3. The touch display panel according to claim 2, wherein a longitudinal extending length of the gate lead equals to that of the touch lead.

4. The touch display panel according to claim 3, wherein the signal leads, the gate leads and the touch leads are all arranged in the same layer as data lines which are arranged longitudinally on the substrate and are insulated from the data lines.

5. The touch display panel according to claim 4, wherein each signal lead, each gate lead and each touch lead are positioned in one-to-one correspondence with pixel units which are arranged in different columns on the substrate, and the signal lead, the gate lead or the touch lead is arranged between two adjacent pixel units.

6. The touch display panel according to claim 4, wherein each signal lead, each gate lead and each touch lead are positioned in one-to-one correspondence with pixel units which are arranged in different columns on the substrate;

each of the pixel units comprises a red sub-pixel unit, a green sub-pixel unit, and a blue sub-pixel unit;

the signal lead is arranged between the red sub-pixel unit and the green sub-pixel unit, or between the green sub-pixel unit and the blue sub-pixel unit;

the gate lead is arranged between the red sub-pixel unit and the green sub-pixel unit, or between the green sub-pixel unit and the blue sub-pixel unit; and the touch lead is arranged between the red sub-pixel unit and the green sub-pixel unit, or between the green sub-pixel unit and the blue sub-pixel unit.

7. The touch display panel according to claim 1, wherein the first sub-signal lead is electrically connected to the gate line via a through hole extending through a first insulating layer arranged between the first signal lead and the gate line.

8. The touch display panel according to claim 1, wherein the touch electrode double as a common electrode on the substrate, the second sub-signal lead is electrically connected to the touch electrode via a through hole extending through a second insulating layer arranged between the common electrode and the second sub-signal lead.

9. A display device, comprising the touch display panel according to claim 1.

* * * * *